United States Patent
Huang et al.

(10) Patent No.: US 11,520,589 B2
(45) Date of Patent: Dec. 6, 2022

(54) DATA STRUCTURE-AWARE PREFETCHING METHOD AND DEVICE ON GRAPHICS PROCESSING UNIT

(71) Applicant: NATIONAL UNIVERSITY OF DEFENSE TECHNOLOGY, Hunan (CN)

(72) Inventors: Libo Huang, Hunan (CN); Hui Guo, Hunan (CN); Zhong Zheng, Hunan (CN); Zhiying Wang, Hunan (CN); Wei Guo, Hunan (CN); Guoqing Lei, Hunan (CN); Junhui Wang, Hunan (CN); Bingcai Sui, Hunan (CN); Caixia Sun, Hunan (CN); Yongwen Wang, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 148 days.

(21) Appl. No.: 16/960,894

(22) PCT Filed: Apr. 28, 2019

(86) PCT No.: PCT/CN2019/084774
§ 371 (c)(1),
(2) Date: Jul. 9, 2020

(87) PCT Pub. No.: WO2020/073641
PCT Pub. Date: Apr. 16, 2020

(65) Prior Publication Data
US 2020/0364053 A1    Nov. 19, 2020

(30) Foreign Application Priority Data
Oct. 11, 2018  (CN) .......................... 201811183490.8

(51) Int. Cl.
*G06F 9/38* (2018.01)
*G06F 9/50* (2006.01)
(Continued)

(52) U.S. Cl.
CPC .......... *G06F 9/3802* (2013.01); *G06F 9/5016* (2013.01); *G06F 11/3037* (2013.01);
(Continued)

(58) Field of Classification Search
None
See application file for complete search history.

(56) References Cited

U.S. PATENT DOCUMENTS

| 7,551,178 B2 * | 6/2009 | Chung .................. G06T 15/005 345/557 |
| 9,535,842 B2 * | 1/2017 | Schwetman, Jr. ...... H04L 69/22 |

(Continued)

FOREIGN PATENT DOCUMENTS

| CN | 104899156 | 9/2015 |
| CN | 104952032 | 9/2015 |
| CN | 109461113 | 3/2019 |

OTHER PUBLICATIONS

'Graph Prefetching Using Data Structure Knowledge' by Sam Ainsworth et al., copyright 2016, ACM. (Year: 2016).*
(Continued)

*Primary Examiner* — Steven G Snyder
(74) *Attorney, Agent, or Firm* — JCIP Global Inc.

(57) ABSTRACT

The invention discloses a data structure-aware prefetching method and device on a graphics processing unit. The method comprises the steps of acquiring information for a memory access request in which a monitoring processor checks a graph data structure and read data, using a data structure access mode defined by a breadth first search and graph data structure information to generate four corre- (Continued)

sponding vector prefetching requests and store into a prefetching request queue. The device comprises a data prefetching unit distributed into each processing unit, each data prefetching unit is respectively connected with an memory access monitor, a response FIFO and a primary cache of a load/store unit, and comprises an address space classifier, a runtime information table, prefetching request generation units and the prefetching request queue. According to the present invention, data required by graph traversal can be prefetched more accurately and efficiently using the breadth first search, thereby improving the performance of GPU to solve a graph computation problem.

8 Claims, 5 Drawing Sheets

(51) Int. Cl.
    *G06F 11/30*     (2006.01)
    *G06T 1/20*     (2006.01)
    *G06F 12/0862*     (2016.01)

(52) U.S. Cl.
    CPC ............ *G06F 12/0862* (2013.01); *G06T 1/20* (2013.01); *G06F 2212/455* (2013.01)

(56) References Cited

U.S. PATENT DOCUMENTS

| | | | |
|---|---|---|---|
| 10,810,257 B2* | 10/2020 | Van Rest | G06F 16/9024 |
| 11,176,046 B2* | 11/2021 | Liao | G06F 12/0862 |
| 2016/0062894 A1* | 3/2016 | Schwetman, Jr. | G06F 12/0842 |
| | | | 711/137 |
| 2017/0060958 A1 | 3/2017 | Van Rest et al. | |

OTHER PUBLICATIONS

'DSAP: Data Structure-Aware Prefetching for Breadth First Search on GPU' by Hui Guo et al. from ICPP'18, Aug. 2018, Eugene, Oregon (2018). (Year: 2018).*
'Accelerating BFS via Data Structure-Aware Prefetching on GPU' by Hui Guo et al. from IEEE, copyright 2018. (Year: 2018).*
'Many-Thread Aware Prefetching Mechanisms for GPGPU Applications' by Lee et al., 43rd Annual IEEE/ACM International Symposium on Microarchitecture, 2010. (Year: 2010).*
'NGraph: Parallel Graph Processing in Hybrid Memory Systems' by Wei Liu et al., IEEE, copyright 2019. (Year: 2019).*
"International Search Report (Form PCT/ISA/210)" of PCT/JP2019/084774, dated Apr. 28, 2019, pp. 1-4.

* cited by examiner

DATA STRUCTURE-AWARE PREFETCHING METHOD AND DEVICE ON GRAPHICS PROCESSING UNIT

CROSS-REFERENCE TO RELATED APPLICATION

This application is a 371 of international application of PCT application serial no. PCT/CN2019/084774, filed on Apr. 28, 2019, which claims the priority benefit of China application no. 201811183490.8, filed on Oct. 11, 2018. The entirety of each of the above mentioned patent applications is hereby incorporated by reference herein and made a part of this specification.

TECHNICAL FIELD

The present invention relates to a data prefetching field of a graphics processing unit, in particular to a data structure-aware prefetching method and device on a graphics processing unit.

BACKGROUND

As the problem scales of graph computing applications are increasingly larger, using the graphics processing unit (GPU) to accelerate graph computing applications in parallel has become a key solution for large scale graph computing. Because most of the graph analytics applications have uncomplicated arithmetic calculations, the biggest cost comes from memory accesses generated by graph traversing. Breadth First Search (BFS) is the most widely used graph traversing algorithm. However, GPU cannot accelerate BFS efficiently due to the irregular memory access pattern of BFS. GPU has to issue more than one memory requests for one irregular memory access, which dramatically impacts its efficiency. Moreover, GPU has a bad caching behaviour for the data structures of the graph, the miss rate of which is even greater than 80%. As a result, all the threads have to spend many cycles to wait for data and even worse, GPU cannot achieve the latency hiding through its massive parallelism due to the insufficient arithmetic calculations of BFS.

Data prefetching is one of the promising techniques to improve the efficiency of memory accesses and cache efficiency. Typical prefetchers on GPU, such as stream prefetchers, stride prefetchers and GHB prefetchers, can effectively reduce the memory latency for applications with regular access patterns. These prefetching techniques reduce the latency of accesses to off-chip memory efficiently and effectively. However, for irregular memory accesses, the error rate of prefetching prediction based on typical prefetching mechanisms is much higher than that for regular memory accesses. The high error rate of prediction causes severe cache pollution and memory bandwidth waste due to the useless data prefetching. Also, typical pattern-detected based prefetching mechanisms are too inefficient to identify complicated and various access patterns of irregular memory accesses. And, due to the inefficient pattern detection, these prefetching mechanisms almost make no contributions to reduce the latency of memory accesses and improve the efficiency of GPU.

Generally, there are three kinds of main typical data prefetching mechanisms: stride prefetcher, stream prefetcher and global history buffer prefetcher.

As shown in FIG. 1, the stride prefetcher uses a table to record the partial history buffer information. The information mainly includes a program counter (PC, as the index of the table), a latest memory access address (for the computation of the stride and the next memory access), a stride between the two recent memory access addresses (a difference between the two recent memory access addresses) and a significance bit of the stride (marking whether the current recorded stride is valid). If a memory access address of a memory access instruction from the same PC has a constant stride, the stride prefetcher will compute the address of data to be prefetched by using the stride and the latest accessed address.

As shown in FIG. 2, the stream prefetcher usually tracks an accessing direction to a certain memory region. When all memory access addresses continuously change toward the same direction, the stream prefetcher will continuously read data to the prefetcher cache in a unit of the cache block based on the identified direction. Therefore, the prefetched data is not stored into an on-chip cache to avoid the prefetched data from polluting useful data in the cache. If a data access causes cache failure, the cache will fetch the prefetches cache block into the cache. When the identified sequential memory access pattern is changed, the prefetcher's cache will be flushed.

As shown in FIG. 3, the global history buffer (GHB) prefetcher uses a global history buffer to store all the global addresses information of the missed accesses in an entire system Each of the GHB entries stores a miss memory access address and a pointer. These pointers link the GHB entries from the same index in the time-ordered sequence. Another index table is also used by the global history buffer prefetcher. This table is used for storing keys as the index of the index GHB entries, and the key may be the PC of the instructions or the miss memory access address. A pointer, corresponding to keys as the index, that points to the GHB entries corresponding to the keys as the index, and all entries with the same keys as the index can be found out from GHB by virtue of this pointer. The global history buffer prefetcher can work together with other data prefetching mechanisms, for instance, the stride prefetcher and the stream prefetcher, so as to identify various memory access patterns.

As can be seen, the three typical data prefetchers are designed based upon one or a plurality of common regular memory access patterns. For the irregular memory access pattern of the breadth first search, the prefetching efficiencies of the three data prefetchers are very low efficient, even invalid.

SUMMARY

The technical problem to be solved by the present invention is to: with respect to the above problems of the existing technology, provide a data structure-aware prefetching method and device on graphics processing unit (GPU) that faces the breadth first search, can efficiently prefetch irregular memory access data, and is transparent to the programmers for programming, with a simple hardware structure.

To solve the above technical problem, the technical solution applied by the present invention is as follows:

A data structure-aware prefetching method on graphics processing unit (GPU), comprising the following implementation steps:

1) acquiring information about a memory access request in which a monitoring processor checks a graph data structure and read data;

2) selecting a corresponding data prefetching request generation mode according to the type of the memory access request: if the memory access request is an ordinary read access to a work list vector, generating a next prefetching request for the work list vector; if the memory access request is a prefetching request for the work list vector, generating a prefetching request for a vertex list vector; if the memory access request is a prefetching request for the vertex list vector, generating a prefetching request for an edge list vector; if the memory access request is a prefetching request for the edge list vector, generating a prefetching request for the visited list vector;

3) storing the generated prefetching request into a prefetching request queue.

Preferably, acquiring the memory access request in which the monitoring processor checks the graph data structure in step 1) comprises: the memory access monitor in the load/store unit is responsible for monitoring an ordinary memory access read instruction access to the work list vector, and all memory access information recorded by a response FIFO in the load/store unit and processed by a primary cache and the read data.

Preferably, in step 2), when the next prefetching request is generated for the work list vector, a data address of the next prefetching request for the work list vector is a sum of a data address read by the memory access request plus the read data size.

Preferably, the detailed steps of generating the prefetching request for the vertex list vector in step 2) include: determining addresses of a corresponding line and a next line of the prefetching request for the vertex list vector according to a node ID obtained when the prefetching request for the work list vector is generated last time, and if the addresses of the corresponding and next lines are in the same cache block, generating one memory access request to simultaneously take back the addresses of the corresponding and next lines; if the addresses of the corresponding and next lines are not in the same cache block, generating two memory access requests to respectively take back the addresses of the corresponding and next lines.

Preferably, the detailed steps of generating the prefetching request for the edge list vector in step 2) include: the prefetching request for the edge list vector is generated according to the start and end indexes of the edge list vector at the runtime, and the number of generated requests mainly depends on the number of cache blocks required by data for edge storage and address alignment.

Preferably, the detailed steps of generating a prefetching request for the visited list vector in step 2) include: reading a return result of the prefetching request for the edge list vector to compute the visited list vector data, and generating a corresponding access request address for every read value.

A data structure-aware prefetching device on a graphics processing unit comprises a data prefetching unit distributed in each processing unit, and each data prefetching unit is respectively connected with a memory access monitor, a response FIFO and a primary cache of the load/store unit respectively, the data prefetching unit comprises:

an address space classifier, used for selecting the generating mode of the corresponding data prefetching request according to the type of the memory access request in which the processor checks the graph data structure;

a runtime information table, used for respectively recording runtime information of various vectors in various processing unit Warps, the runtime information of various vectors includes an index of the work list vector, an index of a vertex list vector, and the start and end indexes of the edge list vector;

a prefetching request generation unit, used for executing different data prefetching request generation mode based on designation: if the memory access request is an ordinary read access to the work list vector, generating a next prefetching request for the work list vector; if the memory access request is a prefetching access to the work list vector, generating a prefetching request for the vertex list vector; if the memory access request is a prefetching access to the vertex list vector, generating a prefetching request for the edge list vector; if the memory access request is a prefetching request for the edge list vector, generating a prefetching request for the visited list vector;

a prefetching request queue, used for storing the generated data prefetching requests.

Preferably, the address space classifier comprises an address space range table and eight address comparators. The address space range table respectively includes eight addresses corresponded to the start and end addresses of the address space ranges of the work list vector, the vertex list vector, the edge list vector and the visited list vector respectively. One input channel of each address comparator in the eight comparators is an accessed address in the information from the load/store unit, and the other input channel is a corresponding address in the address space range table, and the output ends of the eight address comparators are respectively connected with the prefetching request generation unit.

Preferably, each item in the runtime information table includes five information, which includes WID, an index of the work list vector, an index of the vertex list vector, and a start and an end indexes of the edge list vector, wherein WID is used for recording the processing unit Warp IDs; the runtime information table further comprises a selector used for renewing corresponding items in the runtime information table according to the memory access information from the information source from the information of the load/store unit, the Warp ID of each processing unit Warp and the accessed data. The information source is used for distinguishing whether the access information is from the memory access monitor or the response FIFO; if the access information is from the memory access monitor, determining to start prefetching data required by traversal for the new node, emptying the corresponding WID entries in the runtime information table and recording the accessed data into the work list index; If the access information is from the response FIFO, the accessed data is recorded into the corresponding WID entries in the runtime information table.

Preferably, the prefetching request generation unit includes a prefetching generation unit selector, a work list vector prefetching request generation unit, a vertex list vector prefetching request generation unit, an edge list vector prefetching request generation unit and a visited list vector prefetching request generation unit, wherein the prefetching generation unit selector selects one of the work list vector prefetching request generation unit, the vertex list vector prefetching request generation unit, the edge list vector prefetching request generation unit and the visited list vector prefetching request generation unit to generate the prefetching request according to the type of the memory access information output by the address space classifier, the information source from the information of the load/store unit and the runtime information output by the runtime information table; the work list vector prefetching request generation unit is used for generating the next prefetching request for the work list vector and writing the same into the prefetching request queue; the vertex list vector prefetching request generation unit is used for generating the prefetching request for the vertex list vector and writing the same into the prefetching request queue; the edge list vector prefetching request generation unit is used for generating the prefetching request for the edge list vector and writing the same into the prefetching request queue; the visited list vector prefetching request generation unit is used for generating a prefetching request for the visited list vector and writing the same into the prefetching request queue.

Compared with the prior art, the data structure-aware prefetching method on a graphics processing unit according to the present invention has the following advantages:

1. According to the present invention, the irregular memory access data of the breadth first search can be prefetched efficiently. A data structure-aware prefetching mechanism of the present invention acquires a mode of accessing to a graph data structure in a breadth first search manner explicitly, and reads data required by searching a next node to an on-chip cache in advance by using node information that is being searched.

2. According to the present invention, a hardware structure implementation mode is simple. The computational logic of data prefetching unit is very simple because no complicated computation is required for the data prefetching unit. Data prefetching is mainly consumed for storage of information about the graph data structure and runtime, but this storage can be solved by on-chip sharing storage.

3. The present invention is transparent to programmers for programming. Massive changes for primary programs are not required if the data structure-aware prefetching mechanism of the present invention is in use, that is, a primary code distributed for primary applying memory space is only replaced by a code distributed for applying memory space with a data structure mark.

A data structure-aware prefetching device on a graphics processing unit according to the present invention is a hardware for a data structure-aware prefetching method on the graphics processing unit according to the present invention, and meanwhile has the advantages of the data structure-aware prefetching method on the graphics processing unit, so it will not be discussed here.

DETAILED DESCRIPTION

Figure 1:
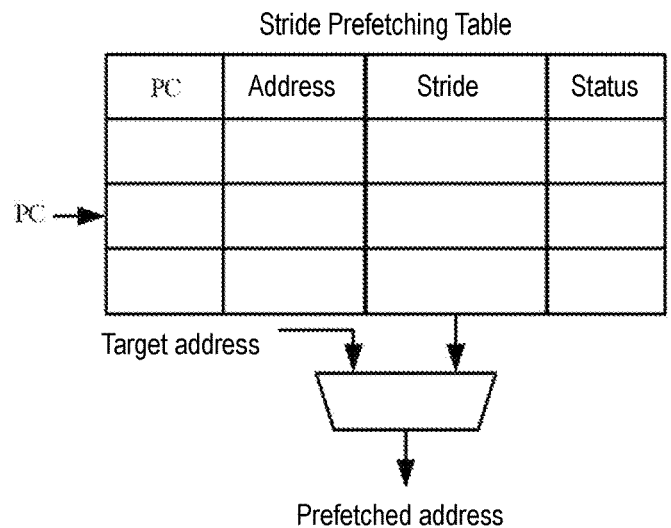
FIG. 1 illustrates an operating principle of an existing stride prefetcher.
Figure 2:
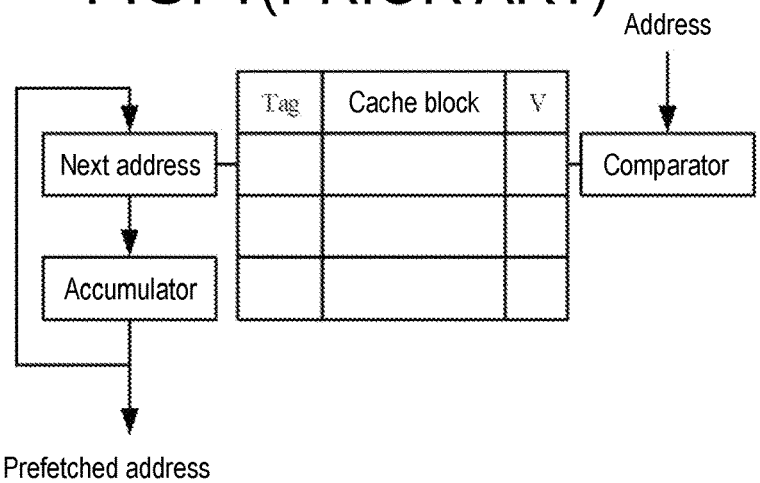
FIG. 2 illustrates an operating principle of an existing stream prefetcher.
Figure 3:
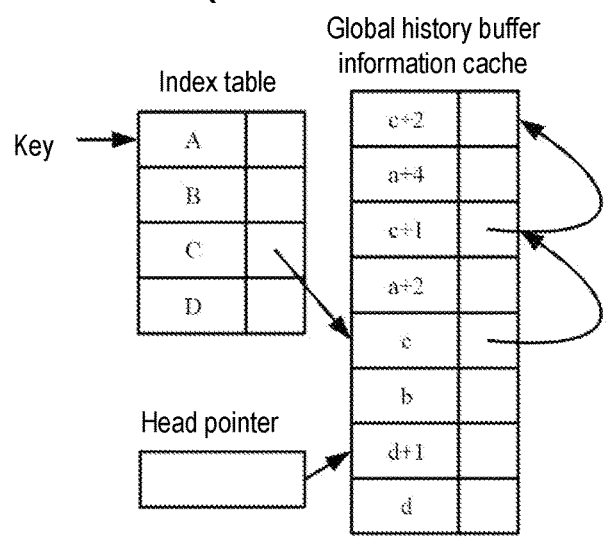
FIG. 3 illustrates an operating principle of an existing global history buffer prefetcher.
Figure 4:
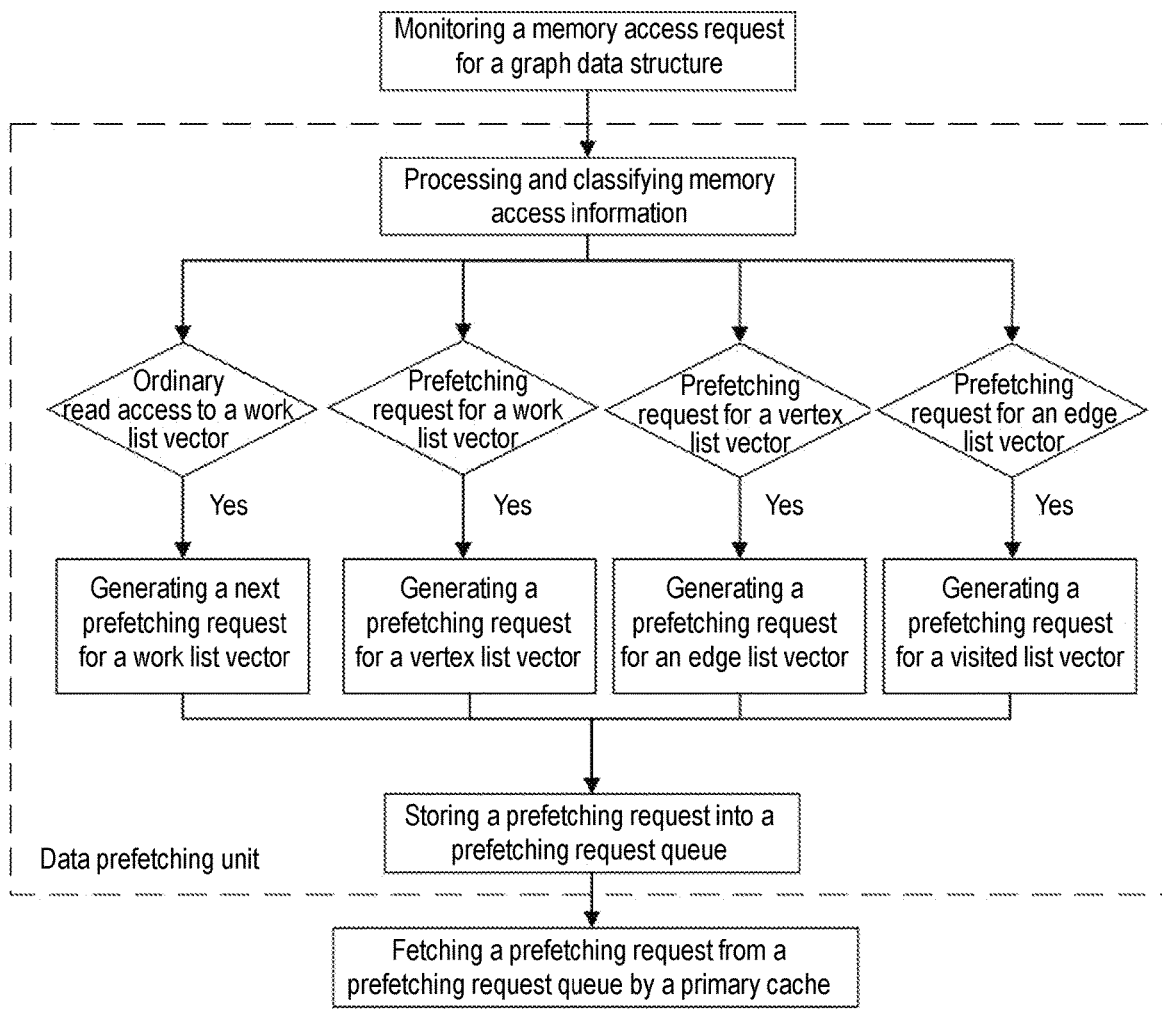
FIG. 4 is a basic flow diagram of a method in an embodiment of the present invention.

As shown in FIG. 4, a data structure-aware prefetching method on a graphics processing unit in this embodiment comprises the following implementation steps:

1) acquiring information about a memory access request in which a monitoring processor checks a graph data structure and read data;

2) selecting a corresponding data prefetching request generation mode according to the type of the memory access request: if the memory access request is an ordinary read access to a work list vector, generating a next prefetching request for the work list vector; if the memory access request is a prefetching request for the work list vector, generating a prefetching request for a vertex list vector; if the memory access request is a prefetching request for the vertex list vector, generating a prefetching request for an edge list vector; if the memory access request is a prefetching request for the edge list vector, generating a prefetching request for the visited list vector;

3) storing the generated prefetching request into a prefetching request queue. The prefetching request is taken out from the prefetching request queue when a primary cache is idle, and then the prefetched data is stored into the primary cache.

An executor of the data structure-aware prefetching method on the graphics processing unit of this embodiment is the data prefetching unit in the processing unit. The monitoring processor checks the memory access request for the graph data structure, and sends the monitored information about the memory access request and the read data to the data prefetching unit; the data prefetching unit selects the corresponding data prefetching request generation mode of the corresponding data prefetching request generation unit according to whether the memory access request is the data prefetching request and to which of the data vectors in the graph data structure the memory cache request accesses after the memory access request information is received. A data stream driven breadth first search algorithm using a Compressed Sparse Row (a compressed format used for storing large spares graph) format graph data structure in this embodiment includes four date vectors: the work list vector, the vertex list vector, the edge list vector and the visited list vector. Therefore, if the memory access request is an ordinary read access to the work list vector, the data prefetching unit generates a next prefetching request for the work list vector; if the memory access request is a prefetching request for the vertex list vector, the data prefetching unit generates a prefetching request for the vertex list vector; if the memory access request is a prefetching request for the vertex list vector, the data prefetching unit generates a prefetching request for the edge list vector; if the memory access request is a prefetching request for the edge list vector, the data prefetching unit generates a prefetching request for the visited list vector.

In this embodiment, acquiring the memory access request in which the monitoring processor checks the graph data structure in step 1) comprises: the memory access monitor in the load/store unit is responsible for monitoring instruction access to the work list vector, and all memory access information of recorded by a response FIFO in the load/store unit and processed by the primary cache and the read data.

In this embodiment, in step 2), when the next prefetching request is generated for the work list vector, a data address of the next prefetching request for the work list vector is a sum of a data address read by the memory access request plus the read data size.

In this embodiment, a detailed step of generating the prefetching request for the vertex list vector in step 2) includes: determining addresses of a corresponding line and a next line of the prefetching request for the vertex list vector according to a node ID obtained when the prefetching request for the work list vector is generated last time, and if the addresses of the corresponding and next lines are in the same cache block, generating one memory access request to simultaneously take back the addresses of the corresponding and next lines; if the addresses of the corresponding and next lines are not in the same cache block, generating two memory access requests to respectively take back the addresses of the corresponding and next lines.

In this embodiment, the detailed steps of generating the prefetching request for the edge list vector in step 2) include: the prefetching request for the edge list vector is generated according to the start and end indexes of the edge list vector at the runtime, and the number of generated requests mainly depends on the number of cache blocks required by data for edge storage and address alignment.

In this embodiment, the detailed steps of generating a prefetching request for the visited list vector in step 2) include: reading a return result of the prefetching request for the edge list vector to compute the visited list vector data, and generating a corresponding access request address for every read value.

The data structure-aware prefetching device on the graphics processing unit in this embodiment comprises a data prefetching unit distributed in each processing unit, and each data prefetching unit is respectively connected with the memory access monitor, the response FIFO and the primary cache of the load/store unit respectively.

Figure 5:
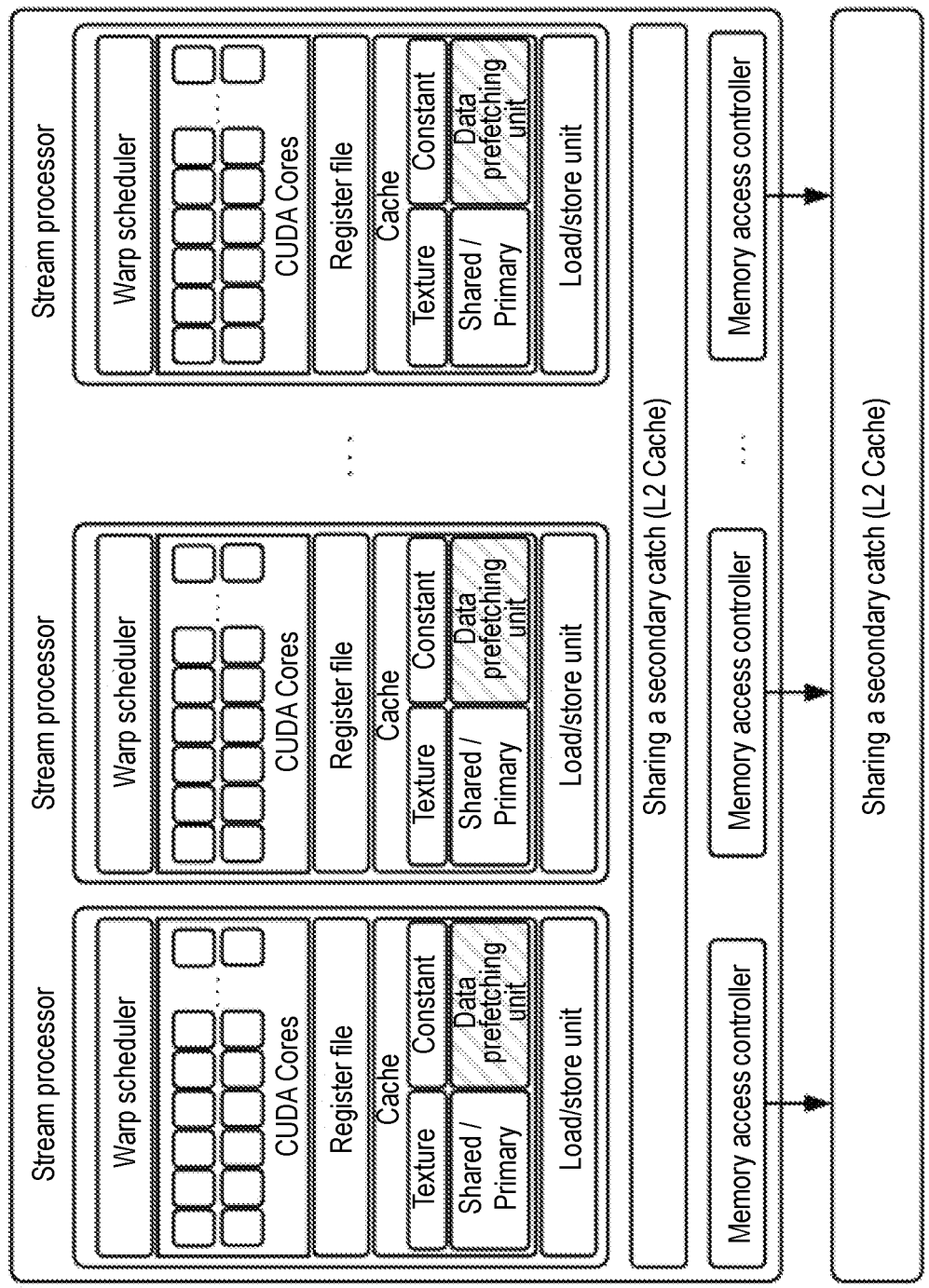
FIG. 5 illustrates a distributed structure of a data pre-processing unit in an embodiment of the present invention.

As shown in FIG. 5, GPU generally contains a plurality of Streaming Multiprocessors (SM) when a system structure is designed, and every SM includes many simple single-threaded processor cores. In a GPU hardware model, every 32 hardware threads are grouped into a processing unit, that is called Warp, for source dispatching. All the threads in the same Warp execute the same instructions at the same time. For the breadth first search algorithm of a data stream driven pattern, for different processing units and streaming multiprocessors, the information of graph data structure is different, because a subset of the work list vector processed by each Warp is independent. Hence, the distributed data prefetching units applied in this embodiment are used for processing and generating the data prefetching requests for each streaming multiprocessor.

Figure 7:
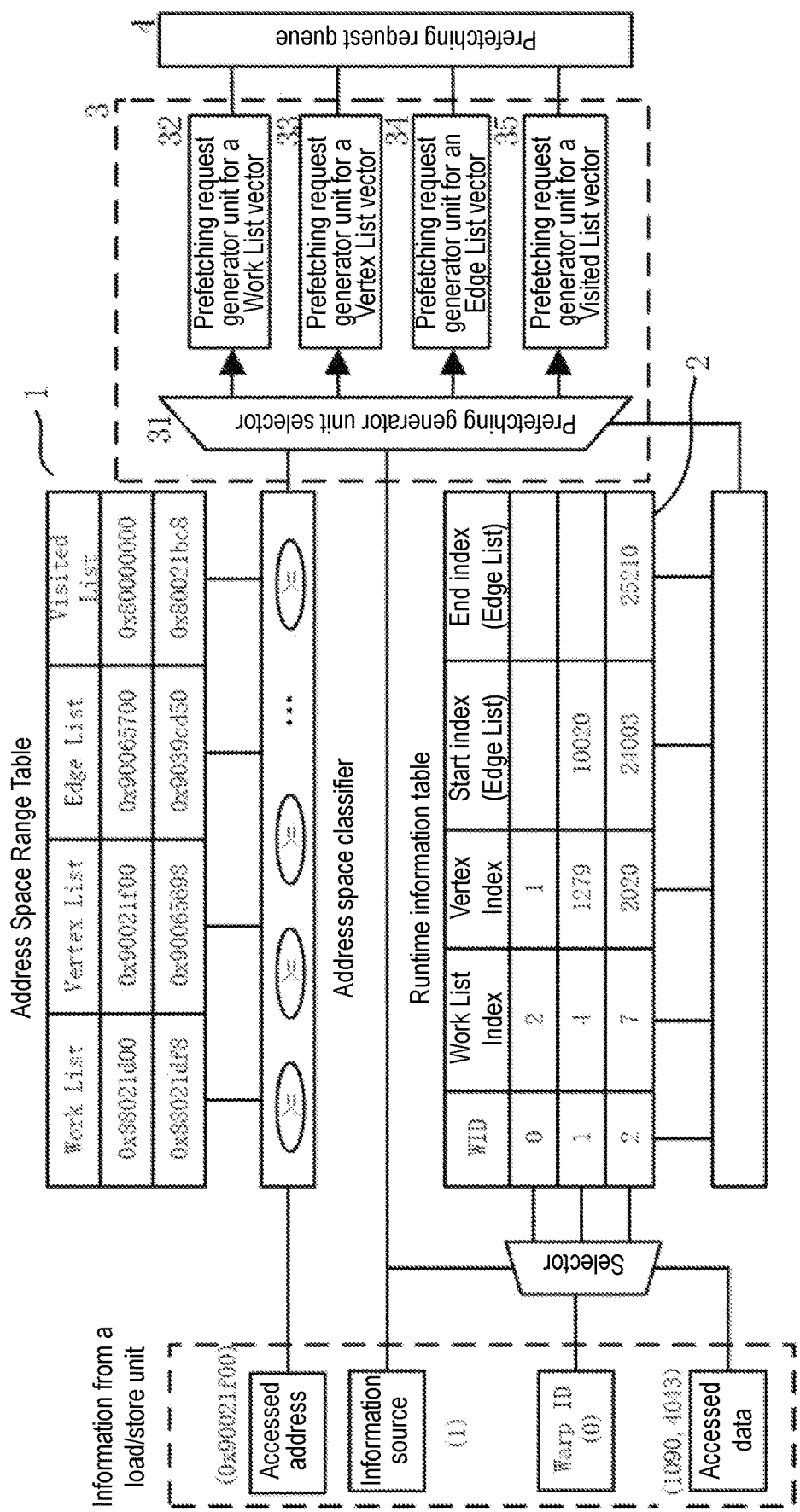
FIG. 7 illustrates a principle structure of a data pre-processing unit in an embodiment of the present invention.

As shown in FIG. 7, the data prefetching unit includes:

an address space classifier 1, used for selecting the generating mode of the corresponding data prefetching request according to the type of the memory access request in which the processor checks the graph data structure;

a runtime information table 2, used for respectively recording runtime information of various vectors in various processing units Warp, the runtime information of various vectors includes an index of the work list vector, an index of a vertex list vector, and the start and end indexes of the edge list vector;

a prefetching request generation unit 3, used for executing different data prefetching request generation mode based on designation: if the memory access request is an ordinary read access to the work list vector, generating a next prefetching request for the work list vector; if the memory access request is a prefetching access to the work list vector, generating the prefetching request for the vertex list vector; if the memory access request is a prefetching access to the vertex list vector, generating the prefetching request for the edge list vector; if the memory access request is the prefetching request for the edge list vector, generating a prefetching request for the visited list vector.

a prefetching request queue 4, used for storing the generated data prefetching requests.

Figure 6:
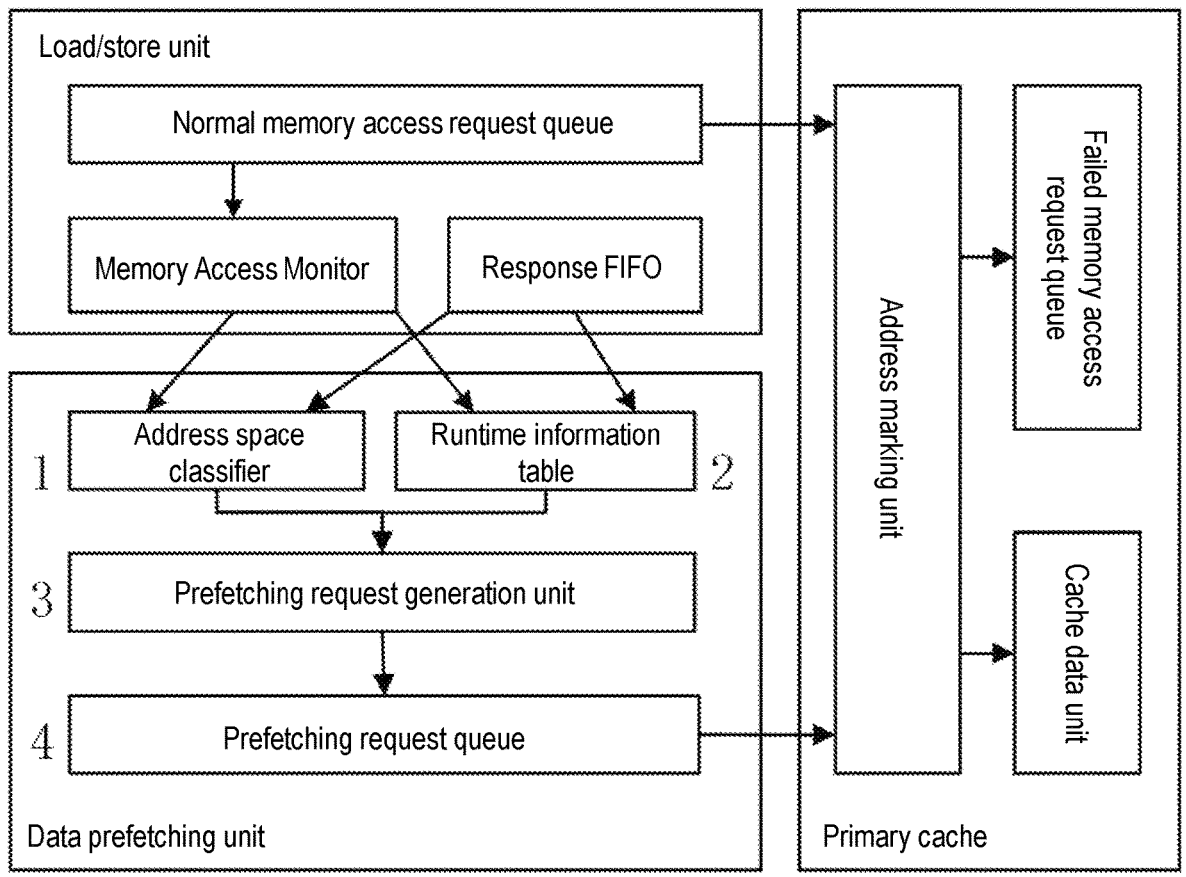
FIG. 6 illustrates a basic structure and an interface of a data pre-processing unit in an embodiment of the present invention.

As shown in FIG. 6, data structure-aware prefetching unit receives the access information for the graph data structure mainly from two components of a load/store unit: a memory access monitor and a response FIFO. The memory access monitor is used for monitoring the normal memory access read instruction access to the work list vector. If these memory access read instructions are monitored, the data prefetching unit knows to start a new round of searching iteration and prepare for prefetching data required by the next round of iteration. The response FIFO is used for recording all memory access request information processed by the primary cache and the read data. The data prefetching request for the data prefetching unit is also processed by the primary cache, so that the response FIFO can monitor the processing of the prefetching request and send the requested data and memory access information to the data prefetching unit. The data prefetching unit uses the information from the load/store unit and the breadth first search to produce the corresponding data prefetching request for the graph data structure access mode. After the information is received from the load/store unit, the data prefetching unit renews corresponding items in the runtime information table 2 based on a Warp ID in the information, and the prefetching request generation unit 3 selects a data prefetching request generator according to an information source and to which one of vectors in the graph data structure the memory access request accesses. Lastly, the data prefetching unit places the generated new data prefetching request into the prefetching request queue 4. The prefetching request generation unit 3 in the data prefetching request is used for controlling the number of the data prefetching requests. The primary cache not only processes the ordinary memory access request, but also processes and takes the data prefetching request as the ordinary memory access request for processing.

As shown in FIG. 7, the address space classifier 1 comprises an address space range table and eight address comparators. The address space range table respectively includes eight addresses corresponded to the start and end addresses of the address space ranges of the work list vector, the vertex list vector, the edge list vector and the visited list vector respectively in a one-to-one correspondence manner. One input channel of each address comparator in the eight comparators is an accessed address in the information from the load/store unit, and the other input channel is a corresponding address in the address space range table, and the output ends of the eight address comparators are respectively connected with the prefetching request generation unit 3. Each address comparator judges which one of data vector address spaces the memory access request address is by comparing the memory access address with the address space ranges of all data vectors.

The runtime information table 2 renews the corresponding items based on the Warp ID according to the received information. As shown in FIG. 7, each item of the runtime information table 2 includes five information: WID, the index of the work list vector, the index of the vertex list vector and the start and end indexes of the edge list vector, wherein WID is used for recording the processing unit Warp ID; the runtime information table 2 further comprises a selector used for renewing corresponding items in the runtime information table 2 according to the memory access information from the information source from the information of the load/store unit, a Warp ID of the processing unit Warp and the accessed data. The information source is used for distinguishing whether the access information is from the memory access monitor or the response FIFO, if the access information is from the memory access monitor, determining to start prefetching data required by traversal for the new node, and emptying the corresponding WID entries in the runtime information table 2 and recording the accessed data into the work list index; and recording the accessed data to the corresponding WID entries in the runtime information table 2 if the access information is from the response FIFO.

In this embodiment, each item in the runtime information table 2 includes five information: WID, the index of the work list vector, the index of the vertex list vector, and the start and end indexes of the edge list vector:

WID: marks which one of Warps the information of this record is. All received memory access information takes the Warp ID information, and which one of information is determined to be renewed by comparing with WID in the runtime information table. 0, 1 and 2 respectively represent Warp 0, Warp1 and Warp2, as shown in FIG. 7.

Index of the work list vector: marks that the prefetching unit is prefetching data for which of nodes traversing the work list vector. This item is renewed by the ordinary memory access information for the work list vector monitored by the memory access monitor. A position of a node item to be accessed in the next circle of the Warp is obtained by determining a position of a node item that is being accessed by the Warp in the work list vector, that is, the next one of the node item that is being accessed. For example, if WID in FIG. 7 is 0 and the work list index is 2, it shows that Warp0 is traversing the first item in the work list vector, while the data prefetching unit is prefetching the data required to traverse a second item of the work list vector.

Index of the vertex vector: marks a node ID to be traversed by the Warp in the next circle. This item is renewed by the prefetching memory access information for the work list vector monitored by the response FIFO. The data address of the prefetching access request can be determined to read the corresponding data and renew the vertex index according to the accessed address of the prefetching memory access information and the work list index recorded by the runtime information table.

Start and end indexes of the edge list vector: mark that all edges of the node to be traversed by the Warp in the next circle are within the edge list vector range. This item is renewed by the prefetching memory access information for the vertex list vector monitored by the response FIFO. The data address of the prefetching access request can be determined to read the corresponding data according to the accessed address of the prefetching memory access information and the vertex list index recorded by the runtime information table. The start and end indexes of the edge list vector of one node are two adjacent items in the vertex list vector, the two values can be obtained by prefetching memory access once if they are stored in the same cache block; otherwise, they are respectively read by prefetching memory access twice. For example, as shown in FIG. 7, for Warp1, the corresponding address of the vertex index 1279 is 0x900232FC, while the corresponding address of the next vertex index 1280 is 0x90023200. With two addresses respectively in the two cache blocks, the start and end indexes of the edge list vector are obtained by prefetching twice. The current status indicates that the end index of the edge list is renewed under the precondition of waiting for the prefetching request for the address 0x90023200.

The selector of the runtime information table 2 renews the runtime information table through three inputs. (1) Due to the fact that each memory access information takes the Warp ID, the selector determines to renew which one of entries by matching with WID in the runtime information table. (2) The information source indicates that the memory access information is from the memory access monitor (expressed in 0) or the response FIFO (expressed in 1). If from the memory access monitor, it indicates that the new node is traversed from the required data, the same WID entry in the table is emptied and the accessed data is recorded into the work list index. If from the response FIFO, the accessed data is recorded into the corresponding contents in the table. Compared with the work list index and the vertex index in the table, the start and end indexes of the edge list cannot be obtained simultaneously, so that the runtime information output sends them to an edge list vector prefetching request generation unit 34 to generate the prefetching request for the edge list vector when all start and end indexes of the edge list are acquired, while the work list index and the vertex list vector can be forwarded to the prefetching request generation unit while the runtime information table is renewed.

The prefetching request generator unit 3 includes a prefetching generator unit selector 31 and four prefetching request generators, both of which are used for producing the memory access requests for four data vectors respectively. As shown in FIG. 7, the prefetching request generation unit 3 includes a prefetching generation unit selector 31, a work list vector prefetching request generation unit 32, a vertex list vector prefetching request generation unit 33, an edge list vector prefetching request generation unit 34 and a visited list vector prefetching request generation unit 35, wherein the prefetching generation unit selector 31 selects one of the work list vector prefetching request generation unit 32, the vertex list vector prefetching request generation unit 33, the edge list vector prefetching request generation unit 34 and the visited list vector prefetching request generation unit 35 to generate the prefetching request according to the type of the memory access information output by the address space classifier 1, the information source in the information of the load/store unit and the runtime information output by the runtime information table 2; the work list vector prefetching request generation unit 32 is used for generating the next prefetching request for the work list vector and writing the same into the prefetching request queue 4; the vertex list vector prefetching request generation unit 33 is used for generating the prefetching request for the vertex list vector and writing the same into the prefetching request queue 4; the edge list vector prefetching request generation unit 34 is used for generating the prefetching request for the edge list vector and writing the same into the prefetching request queue 4; the visited list vector prefetching request generation unit 35 is used for generating a prefetching request for the visited list vector and writing the same into the prefetching request queue 4.

For different access modes of each data vector in the graph data structure, the data prefetching unit is added with four prefetching request generation units (the work list vector prefetching request generation unit 32, the vertex list vector prefetching request generation unit 33, the edge list vector prefetching request generation unit 34 and the visited list vector prefetching request generation unit 35) to respectively generate the prefetching requests for the four data vectors. To overall, the four prefetching request generation units can be divided into two categories: the work list vector prefetching request generation unit 32 generating the work list vector and the generation units generating the prefetching requests for the other three data vectors. This is because the source of the information required by generating the prefetching request by the generator respectively includes the memory access monitor and the response FIFO ° The data prefetching unit generates the prefetching request for the work list vector using the ordinary memory access information for the work list vector monitored by the memory access monitor, while the data prefetching requests for other data vectors need the prefetching request information monitored by the response FIFO. Besides, the data prefetching unit further needs to use the monitored prefetching request access address to select the vertex list vector, the edge list vector or the visited list vector to generate the prefetching request. An access sequence of each data vector can be forecast according to the data structure access mode of the breadth first search. Hence, when the data prefetching unit receives one prefetching request information for the work list vector, it can generate the prefetching request for the vertex list vector, while when it receives the prefetching request for the vertex list vector, it will generate the prefetching request for the edge list vector. Similarly, if the prefetching memory access request for the edge list vector is received, the data prefetching unit will generate the memory access request for the visited list vector. Hence, the source of the information received by the data prefetching unit and the access address of the monitored memory access request jointly determine which one of prefetching request generation units uses.

When the data prefetching unit receives the information about the ordinary memory access read instruction accessing to the work list vector, the work list vector prefetching request generation unit 32 will generate the prefetching request for the work list vector. The prefetching request address is the next data address of this ordinary memory access read instruction request. Hence, the data address of the prefetching request is a result that the data read by the ordinary memory access read instruction plus the data size. For example, if the ordinary memory access read instruction reads the data with the address 0x88021d00, the prefetching request generation unit of the work list will generate the prefetching request for the data with the address 0x88021d04.

According to the definition for the Compressed Sparse Row format graph data structure, the vertex list vector records the starting position of each line of non-zero elements of an adjacent matrix of the figure in the edge list vector in the edge list vector (each line of the adjacent matrix corresponds to the node in the figure, while the non-zero elements are edges connecting the node, and these edges are continuously stored in the edge list vector), so that the number of edges of a certain node needs determining, and meanwhile the corresponding node and the value of the next node in the vertex list vector are read. On account that the prefetching request for the work list vector obtains the vertex index, the vertex list vector prefetching request generation unit 33 can obtain the addresses of the node and the next node in the vertex list vector according to this index. Generally, when the two values are in the same cache block, one memory access request can take back the two values at the same time. However, if the two values are not in the same cache block, the vertex list vector prefetching request generation unit 33 will generate two memory access requests.

According to the start and end indexes of the corresponding edge list vector in the runtime information table, the prefetching request generation unit of the edge list vector generates the prefetching request for the edge list vector. For example, as FIG. 7, the start and end indexes of the edge list in the entry with WID as 2 in the runtime information table are respectively 24003 and 25210, this indicated that all edges of the connection node 2020 are from 24003 to 25210 in the edge list vector (excluding the 25210). Due to the fact that the information of each node edge is continuously stored in the edge list vector, the number of the generated requests mainly depends on the number of cache blocks required by the data for storage of these edges, and the unaligned addresses shall be taken into account.

For the breadth first search, the edge list vector stores an end node ID of the edge, so that the visited list vector prefetching request generation unit 35 needs to read the end node ID of the prefetching request for the edge list vector, and the end node ID as the index for the visited list can obtain the address reading the corresponding visited list vector value by virtue of computation. Due to discontinuous and dispersed end node IDs, the visited list vector prefetching request generation unit 35 needs to generate the memory access address of the visited list vector for each value in the prefetched cache block respectively. The cache block of GPU is 128 B generally. If the data is 4 B, it indicates that the cache block stores 32 end node IDs, and the visited list vector prefetching request generation unit needs to respectively generate 32 memory access requests for these end node IDs.

To sum up, according to the data structure-aware prefetching method and device for prefetching data from a data of this embodiment, the data structure access mode defined by the breadth first search and the graph data structure information are applied to generating the corresponding data prefetching requests. Compared with the data prefetching mechanism on the existing GPU, data required by graph traversal can be prefetched more accurately and efficiently by the data prefetching method and device using the breadth first search, thereby improving the performance of GPU to solve a graph computation problem.

The above are only preferred implementation method of the present invention, and the protection scope of the present invention is not limited to the embodiment mentioned above. The technical solutions under the ideas of the present invention fall into the protection scope of the present invention. It should be pointed out that, for an ordinary person skilled in the art, some improvements and modifications without departing from the principle of the present invention shall be deemed as the protection scope of the present invention.

What is claimed is:

1. A data structure-aware prefetching method on a graphics processing unit, comprising the following implementation steps:
   1) acquiring information about a memory access request in which a monitoring processor checks a graph data structure and read data;
   2) selecting a corresponding data prefetching request generation mode according to a type of the memory access request:
      if the memory access request is an ordinary read access to a work list vector, generating a next prefetching request for the work list vector;
      if the memory access request is a prefetching request for the work list vector, generating a prefetching request for a vertex list vector;
      if the memory access request is a prefetching request for the vertex list vector, generating a prefetching request for an edge list vector;
      if the memory access request is a prefetching request for the edge list vector, generating a prefetching request for a visited list vector;
   3) storing the generated prefetching request into a prefetching request queue,
   wherein the detailed steps of generating the prefetching request for the vertex list vector in the step 2) comprising: determining addresses of a corresponding line and a next line of the prefetching request for the vertex list vector according to a node identifier (node ID)

obtained when the prefetching request for the work list vector is generated last time;

if the addresses of the corresponding line and the next line are in a same cache block, generating one memory access request to simultaneously take back the addresses of the corresponding line and the next line;

if the addresses of the corresponding line and the next line are not in the same cache block, generating two memory access requests to respectively take back the addresses of the corresponding line and the next line.

2. The data structure-aware prefetching method on the graphics processing unit as claimed in claim 1, wherein acquiring the memory access request in which the monitoring processor checks the graph data structure in the step 1) comprises:

a memory access monitor in a load/store unit is responsible for monitoring an ordinary memory access read instruction access to the work list vector, and all memory access information recorded by a response First-In First-Out (FIFO) in the load/store unit and processed by a primary cache and the read data.

3. The data structure-aware prefetching method on the graphics processing unit as claimed in claim 1, wherein in the step 2), when the next prefetching request is generated for the work list vector, a data address of the next prefetching request for the work list vector is a sum of a data address read by the memory access request plus a size of the read data.

4. The data structure-aware prefetching method on the graphics processing unit as claimed in claim 1, wherein the detailed steps of generating the prefetching request for the edge list vector in the step 2) comprising: the prefetching request for the edge list vector is generated according to start and end indexes of the edge list vector at runtime, and a number of generated requests mainly depends on a number of cache blocks required by data for edge storage and address alignment.

5. The data structure-aware prefetching method on the graphics processing unit as claimed in claim 1, wherein the detailed steps of generating the prefetching request for the visited list vector in the step 2) comprising: reading a return result of the prefetching request for the edge list vector to compute the visited list vector data, and generating a corresponding access request address for every read value.

6. A data structure-aware prefetching device on a graphics processing unit, comprises a data prefetching unit distributed in each processing unit, and each of the data prefetching unit is respectively connected with a memory access monitor, a response First-In First-Out (FIFO) and a primary cache of a load/store unit, wherein the data prefetching unit comprises:

an address space classifier, used for selecting a corresponding data prefetching request generation mode according to a type of a memory access request in which the processor checks a graph data structure;

a runtime information table, used for respectively recording runtime information of various vectors in various processing unit Warps, the runtime information of the various vectors comprises an index of a work list vector, an index of a vertex list vector, and a start index and an end index of an edge list vector;

a prefetching request generation unit, used for executing different data prefetching request generation mode based on designation: if the memory access request is an ordinary read access to the work list vector, generating a next prefetching request for the work list vector; if the memory access request is a prefetching access to the work list vector, generating a prefetching request for the vertex list vector; if the memory access request is a prefetching access to the vertex list vector, generating a prefetching request for the edge list vector; if the memory access request is a prefetching request for the edge list vector, generating a prefetching request for a visited list vector;

a prefetching request queue, used for storing the generated data prefetching requests, wherein each item in the runtime information table comprises five information, which comprises Warp identifier (WID), the index of the work list vector, the index of the vertex list vector, and the start index and the end index of the edge list vector, wherein the WID is used for recording Warp IDs of the processing unit;

the runtime information table further comprises a selector used for renewing corresponding items in the runtime information table according to a memory access information from an information source from the information of the load/store unit, the Warp ID of each processing unit Warp and accessed data;

the information source is used for distinguishing whether the access information is from the memory access monitor or the response FIFO;

if the access information is from the memory access monitor, determining to start prefetching data required by traversal for a new node, emptying the corresponding WID entries in the runtime information table and recording the accessed data into the work list index;

if the access information is from the response FIFO, the accessed data is recorded into the corresponding WID entries in the runtime information table.

7. The data structure-aware prefetching device on the graphics processing unit as claimed in claim 6, wherein the address space classifier comprises an address space range table and eight address comparators;

the address space range table respectively comprises eight addresses corresponded to start and end addresses of the address space ranges of the work list vector, the vertex list vector, the edge list vector and the visited list vector respectively;

one input channel of each of the address comparator in the eight address comparators is an accessed address in an information of the load/store unit, and the other input channel is a corresponding address in the address space range table, and the output ends of the eight address comparators are respectively connected with the prefetching request generation unit.

8. The data structure-aware prefetching device on the graphics processing unit as claimed in claim 6, wherein the prefetching request generation unit comprises a prefetching generation unit selector, a work list vector prefetching request generation unit, a vertex list vector prefetching request generation unit, an edge list vector prefetching request generation unit and a visited list vector prefetching request generation unit, wherein the prefetching generation unit selector selects one of the work list vector prefetching request generation unit, the vertex list vector prefetching request generation unit, the edge list vector prefetching request generation unit and the visited list vector prefetching request generation unit to generate the prefetching request according to the type of the memory access information output by the address space classifier, the information source from the information of the load/store unit and the runtime information output by the runtime information table;

the work list vector prefetching request generation unit is used for generating the next prefetching request for the work list vector and writing the next prefetching request for the work list vector into the prefetching request queue;

the vertex list vector prefetching request generation unit is used for generating the prefetching request for the vertex list vector and writing the prefetching request for the vertex list vector into the prefetching request queue;

the edge list vector prefetching request generation unit is used for generating the prefetching request for the edge list vector and writing the prefetching request for the edge list vector into the prefetching request queue;

the visited list vector prefetching request generation unit is used for generating the prefetching request for the visited list vector and writing the prefetching request for the visited list vector into the prefetching request queue.

* * * * *